US007159927B2

(12) United States Patent
Ihashi et al.

(10) Patent No.: US 7,159,927 B2
(45) Date of Patent: Jan. 9, 2007

(54) POWERED TAILGATE SYSTEM

(75) Inventors: Yoshitomo Ihashi, Wako (JP); Takeshi Hattori, Wako (JP); Takeki Tanaka, Wako (JP); Osamu Sera, Wako (JP); Akihiro Kitagawa, Wako (JP); Tomofumi Ichinose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 96 days.

(21) Appl. No.: 10/887,204

(22) Filed: Jul. 8, 2004

(65) Prior Publication Data

US 2005/0017539 A1 Jan. 27, 2005

(30) Foreign Application Priority Data

Jul. 23, 2003 (JP) ............................ 2003-278597

(51) Int. Cl.
*B60J 5/10* (2006.01)

(52) U.S. Cl. .................... 296/146.8; 296/56; 296/106; 49/339

(58) Field of Classification Search ............ 296/146.8, 296/106, 56, 146.4; 49/339, 340, 341, 342, 49/343, 344
See application file for complete search history.

(56) References Cited

U.S. PATENT DOCUMENTS

| | | | | |
|---|---|---|---|---|
| 1,668,421 | A * | 5/1928 | Rysdon | 49/341 |
| 6,092,337 | A | 7/2000 | Johnson et al. | |
| 6,142,551 | A * | 11/2000 | Ciavaglia et al. | 296/56 |
| 6,318,025 | B1 * | 11/2001 | Sedlak | 49/341 |
| 6,382,706 | B1 * | 5/2002 | Yuge et al. | 296/146.4 |
| 6,513,859 | B1 * | 2/2003 | Yuge | 296/146.4 |
| 6,789,837 | B1 * | 9/2004 | Mitsui et al. | 296/146.8 |
| 6,834,463 | B1 * | 12/2004 | Fukumoto et al. | 296/146.8 |
| 6,929,310 | B1 * | 8/2005 | Okada | 296/146.8 |

* cited by examiner

*Primary Examiner*—Lori L. Coletta
(74) *Attorney, Agent, or Firm*—Rankin, Hill, Porter & Clark LLP

(57) ABSTRACT

A powered tailgate system in which a direct driven rack 44 is connected to one end of a rod 52, one end of a curved arm 54 is connected to the other end of the rod 52, the other end of the curved arm 54 is connected to a tailgate 15, an arm side slider portion 60 which curves concentrically with the curved arm 54 is provided on the curved arm 54, and a plurality of load receiving portions 87 to 90 adapted to be brought into sliding contact with the arm side slider portion 60 so as to receive a load are disposed on a vehicle body side at intervals along a traveling direction of the curved arm 54.

8 Claims, 15 Drawing Sheets

POWERED TAILGATE SYSTEM

BACKGROUND OF THE INVENTION

The present invention relates a powered tailgate system for opening and closing a tailgate of a vehicle with electric power.

As a technique related to a powered tailgate system for opening and closing a tailgate of a vehicle with electric power, there exists a technique in which a rack gear is moved in longitudinal directions of a vehicle via a pinion gear using electric power, so that a curved arm connected to a rear end of the rack gear is swung in an arc while being guided by a curved guide having the same curvature as that of the curved arm, whereby a tailgate connected to the curved arm is opened and closed (refer to, for example, a patent literature No. 1). In this powered tailgate system, the rack gear for swinging the curved arm is designed to move in the longitudinal directions of the vehicle while oscillating vertically.

[Patent Literature No. 1]

U.S. Pat. No. 6,142,551

In the power tailgate system disclosed in the patent literature No. 1, since the rack gear for swinging the curved arm is designed to move in the longitudinal directions of the vehicle while oscillating vertically, a cover for covering the rack gear on a passenger compartment side sags down to thereby cause a problem that a head clearance above the head of an occupant in the vehicle is difficult to be secured. In addition, since the curved arm is connected to the rear end portion of the rack gear, an electric motor including the pinion gear and a reduction gear mechanism need to be provided in the vicinity of an opening at a rear end of the vehicle that is opened and closed by the tailgate, and depending on structures of vehicle bodies, the provision of the electric motor and the reduction gear mechanism ahead of the opening at the rear of the vehicle may lead to better results in terms of space and rigidity.

In addition, while the load of the curved arm is directed differently depending on directions in which the curved arm is moved or positions thereof, in the event that the curved arm is guided by the curved guide having the uniform curved shape as is described above, there is caused a problem that the load of the curved arm cannot be received effectively.

SUMMARY OF THE INVENTION

Consequently, an object of the invention is to provide a powered tailgate system which can secure a head clearance above the head of the occupant in the vehicle and receive the load effectively.

With a view to attaining the object, according to a first aspect of the invention, there is provided a powered tailgate system in which a direct driven rack (for example, a rack 44 in an embodiment) is connected to one end of a rod (for example, a rod 52 in the embodiment), one end of a curved arm (for example, a curved arm 54 in the embodiment) is connected to the other end of the rod, the other end of the curved arm is connected to a tailgate (for example, a tailgate 15 in the embodiment), an arm side slider portion (for example, an arm side slider portion 60 in the embodiment) which curves concentrically with the curved arm is provided on the curved arm, and a plurality of load receiving portions (for example, load receiving portions 87 to 90 in the embodiment) adapted to be brought into sliding contact with the arm side slider portion so as to receive a load are disposed on a vehicle body side at intervals along a traveling direction of the curved arm.

According to a second aspect of the invention, there is provided a powered tailgate system as set forth in the first aspect of the invention, wherein an outer stay (for example, an outer stay 18 in the embodiment) is connected to the tailgate, and wherein the load receiving portion is provided at a position above a rear portion of the arm side slider portion which results when the tailgate is in a closed state.

According to a third aspect of the invention, there is provided a powered tailgate system as set forth in the first or second aspect of the invention, wherein the load receiving portion is provided at a position above a front portion of the arm side slider which results the tailgate is in the closed state.

According to a fourth aspect of the invention, there is provided a powered tailgate system as set forth in any of the first to third aspects of the invention, wherein the load receiving portion is provided at a position below the front portion of the arm side slider which results the tailgate is in the closed state.

According to a fifth aspect of the invention, there is provided a powered tailgate system as set forth in any of the first to fourth aspects of the invention, wherein the load receiving portion is provided at a position below the rear portion of the arm side slider which results the tailgate is in the closed state.

According to a sixth aspect of the invention, there is provided a powered tailgate system as set forth in any of the first to fifth aspects of the invention, wherein the load receiving portion is provided detachably.

According to a seventh aspect of the invention, there is provided a powered tailgate system as set forth in the sixth aspect of the invention, wherein the load receiving portions are attached to the vehicle body via a hinge attaching bolt 30.

According to the first aspect of the invention, since the direct driven rack that does not oscillate vertically is used, a cover for covering the direct driven rack on the passenger compartment side can be disposed at a higher position, and hence the head clearance above the head of the occupant in the vehicle can be secured. In addition, since the curved arm is connected to the direct driven rack via the rod, an electric motor including a pinion gear and a reduction gear mechanism can be provided ahead of an opening at the rear of the vehicle that is opened and closed by the tailgate so as to be apart from the opening. Furthermore, since the plurality of load receiving portions provided on the vehicle body side and adapted to be brought into sliding contact with the arm side slider portion provided on the curved arm so as to bear the load are disposed at intervals along the traveling direction of the curved arm, the load receiving portions can be disposed at positions that can provide good efficiency in accordance with the direction of load that differs depending on the traveling direction and position of the curved arm.

According to the second aspect of the invention, when the curved arm is swung by the rack via the rod so as to operate the tailgate to open, the tailgate receives the biasing force of the outer stay to thereby move in the opening direction, and as a result, while an upward load is generated in the curved arm, the load so generated can be effectively received by, among the load receiving portions disposed along the traveling direction of the curved arm, the load receiving portion that is provided at the position above the rear portion of the arm side slider portion which results when the tailgate is in the closed state. In addition, when the curved arm is pulled back by the rack via the rod from its state resulting when the tailgate is opened, while an upward load is generated in the curved arm due to the biasing force of the outer stay in an initial stage of the pulling process in particular, the load so generated can be effectively received by, among the load receiving portions disposed along the traveling direction of the curved arm, the load receiving portion that is provided at the position above the rear portion of the arm side slider portion which results when the tailgate is in the closed state. Thus, the load generated when the tailgate is opened or closed can be effectively received by the single load receiving portion.

According to the third aspect of the invention, when the curved arm is swung by the rack via the rod so as to operate the tailgate to open, while a load directed toward the tailgate is generated in the curved arm in an initial stage of the opening process in particular, for example, a partial load of the load so generated which is directed in a direction different from the traveling direction of the curved arm can be received by, among the load receiving portions provided along the traveling direction of the curved arm, the load receiving portion that is provided at the position above the front portion of the arm side slider portion which results when the tailgate is in the closed state.

According to the fourth aspect of the invention, when the curved arm is pulled back by the rack via the rod so as to operate the tailgate to close, while a load directed toward the rack is generated in the curved arm in a final stage of the closing process in particular, for example, a partial load of the load so generated that is directed in a direction differing from the traveling direction of the curved arm can be received by, among the load receiving portions provided along the traveling direction of the curved arm, the load receiving portion that is provided at the position below the front portion of the arm side slider portion which results when the tailgate is in the closed state.

According to the fifth aspect of the invention, when the curved arm is swung by the rack via the rod so as to operate the tailgate to open, while a downward load is generated in the curved arm should the tailgate collide with an obstacle in a final stage of the opening process in particular, the load so generated can be effectively received by, among the load receiving portions provided along the traveling direction of the curved arm, the load receiving portion that is provided at the position below the rear portion of the arm side slider portion which results when the tailgate is in the closed state.

According to the sixth aspect of the invention, since the load receiving portions are provided detachably, even in the event that load receiving portions wear as a result of aged deterioration and their positional relationship with the curved arm deviates, the positional relationship can be restored by replacing the deteriorated load receiving portions. In addition, the positional relationship with the curved arm can be adjusted easily by preparing load receiving portions of plural types and attaching appropriate load receiving portions from the load receiving portions so prepared.

According to the seventh aspect of the invention, since the positioning of the load receiving portions with respect to the center O of a hinge can be implemented with good accuracy, the tailgate can be opened and closed smoothly.

DETAILED DESCRIPTION OF THE PREFERRED EMBODIMENTS

Embodiments representing a best mode for carrying out the invention will be described below by reference to the accompanying drawings.

First Embodiment

Firstly, referring to FIGS. 1 to 13, a first embodiment will be described. Note that a longitudinal direction referred to in the following description means a longitudinal direction with respect to a vehicle which travels forward.

Figure 1:
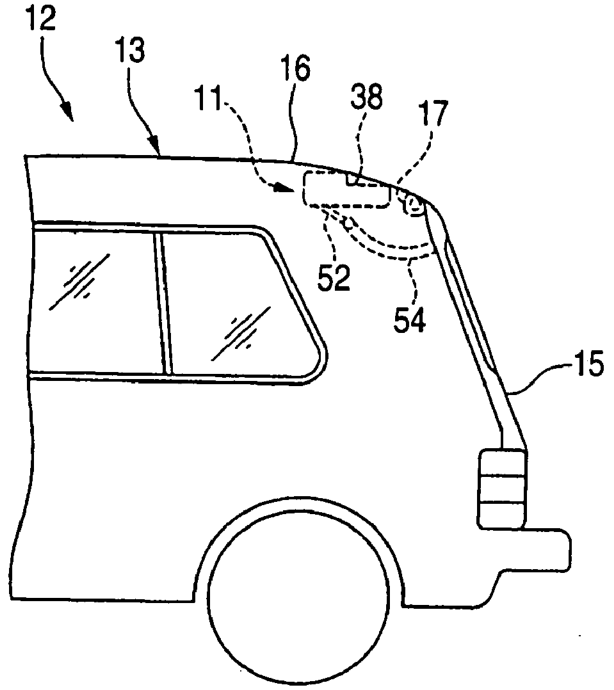
FIG. 1 is a side view showing a rear part of a vehicle to which a powered tailgate system according to a first embodiment of the invention is applied, which shows a state in which a tailgate is fully closed.
Figure 2:
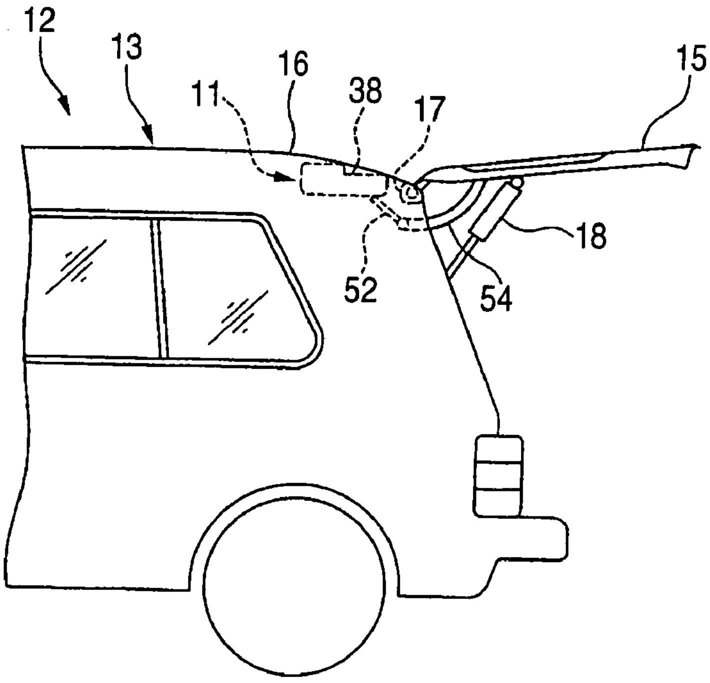
FIG. 2 is a side view showing the rear part of the vehicle to which the powered tailgate system according to the first embodiment of the invention is applied, which shows a state in which the tailgate is fully opened.

FIGS. 1 and 2 show a rear part of a vehicle 12 to which a powered tailgate system of the embodiment is applied, in which a tailgate 15 is provided at a rear end of a vehicle body 13 in such a manner as to be opened and closed. Namely, a hinge 17 is provided at a rear end portion of a roof part 11 constituting an upper part of the vehicle body 13, and the tailgate 15 is supported so as to swing about the center of an axis extending in a transverse direction of a vehicle via the hinge 17. In addition, an outer stay 18 of a gas type is connected to the tailgate, so that the weight balance of the tailgate 15 when it is opened and closed is adjusted by virtue of the biasing force of the outer stay 18. Here, the tailgate 15 swings around the swinging center of the hinge 17 between a fully closed state shown in FIG. 1 and a fully opened state shown in FIG. 2.

Figure 3:
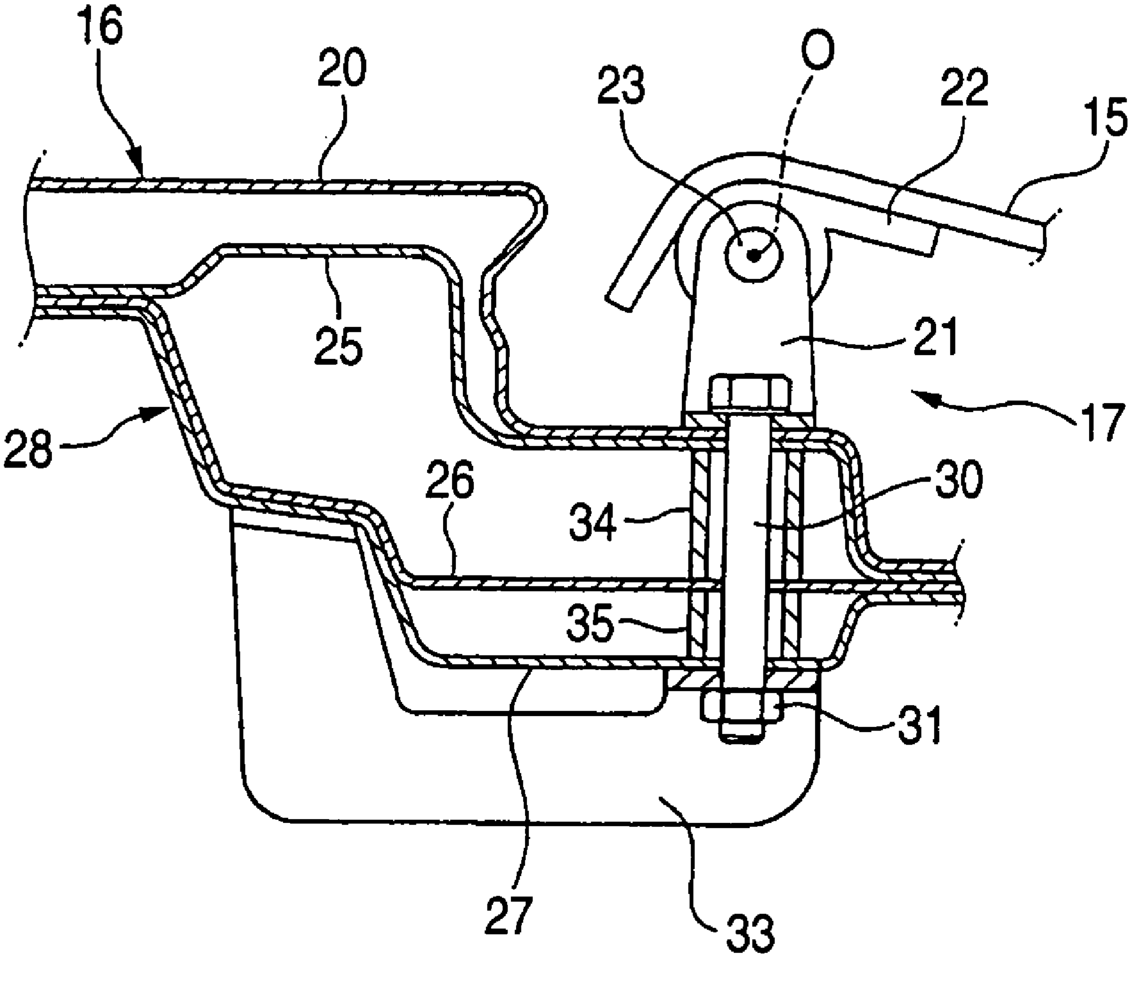
FIG. 3 is a side cross-sectional view showing a hinge at the tailgate of the vehicle to which the powered tailgate system according to the first embodiment of the invention is applied.

As shown in FIG. 3, the hinge 17 has a stationary side member 21 which is fixed to a roof panel 20 of the roof part 16, a swinging side member 22 which is connected to the tailgate 15 and a hinge shaft 23 connecting these two members together rotationally, and the stationary side member 21 is attached to the roof panel 20 of the roof part 16 and a roof rail 28 having a closed cross-sectional shape made up of a plurality of or, to be specific, three panels 25, 26, 27 and extending in the transverse direction below the roof panel 20 via a hinge attaching bolt 30 and a hinge attaching nut 31. Here, a bracket 33 is fastened together to an underside of the roof rail 28 by the hinge attaching bolt 30, and this bracket 33 increases the attachment rigidity of the hinge 17 by being attached to the hinge attaching bolt 30 and extending forward to be brought into abutment with the underside of the roof rail 28 at a front end thereof. Note that collars 34, 35 are provided in the roof rail 28 between the panels 25, 26 and between the panels 26, 27, respectively, in such a manner as to surround the hinge attaching bolt 30.

Figure 4:
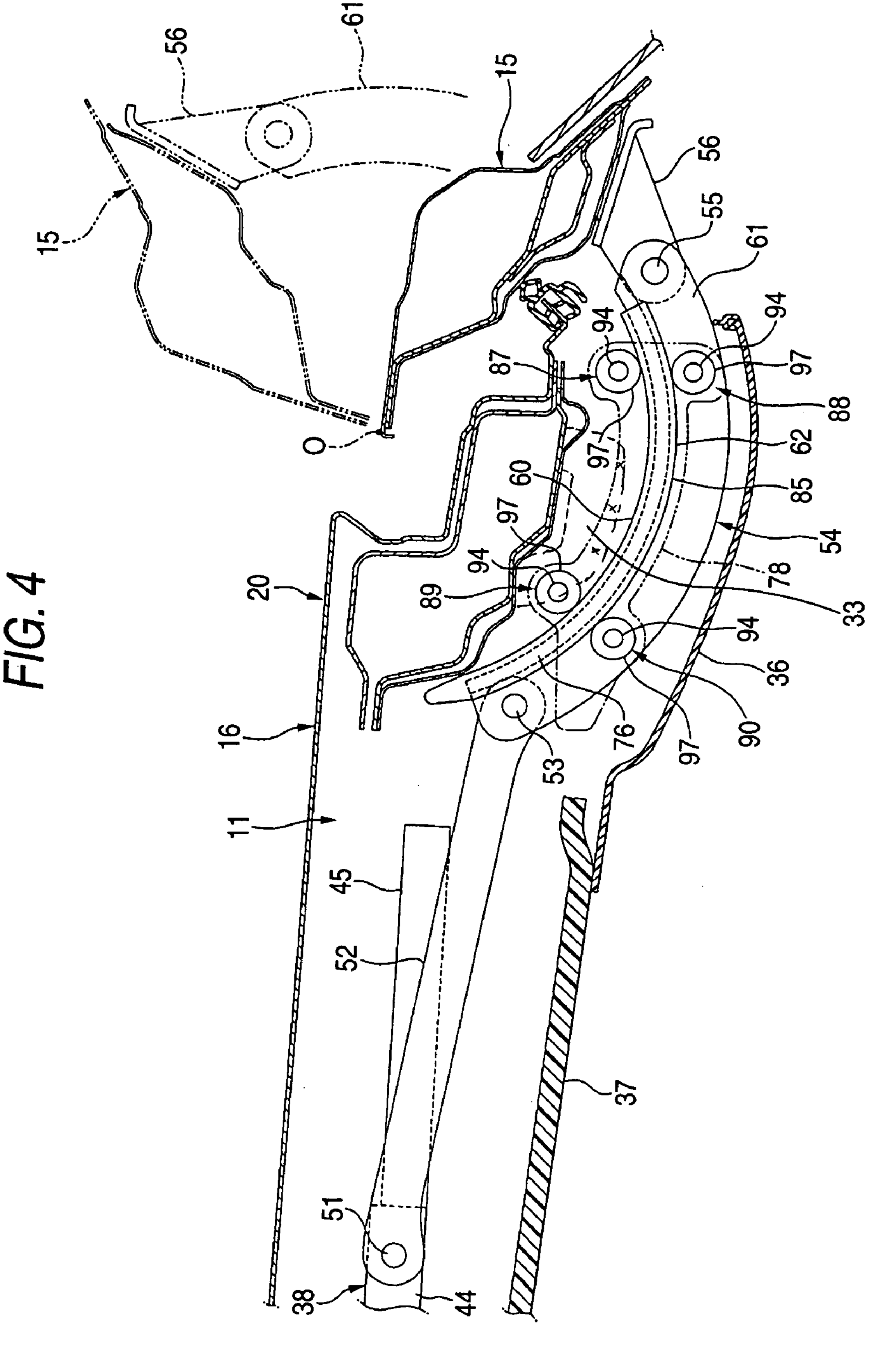
FIG. 4 is a side cross-sectional view showing the powered tailgate system according to the first embodiment of the invention, which shows by solid lines the state in which the tailgate is fully closed.

As shown in FIG. 4, the powered tailgate system 11 according to the embodiment is provided on the roof part 16 of the vehicle body 13 for opening and closing the tailgate 15 using electric power. This powered tailgate system is provided between the roof panel 20 of the roof part 16 and an inner cover 36 and a roof lining 37.

Figure 5:
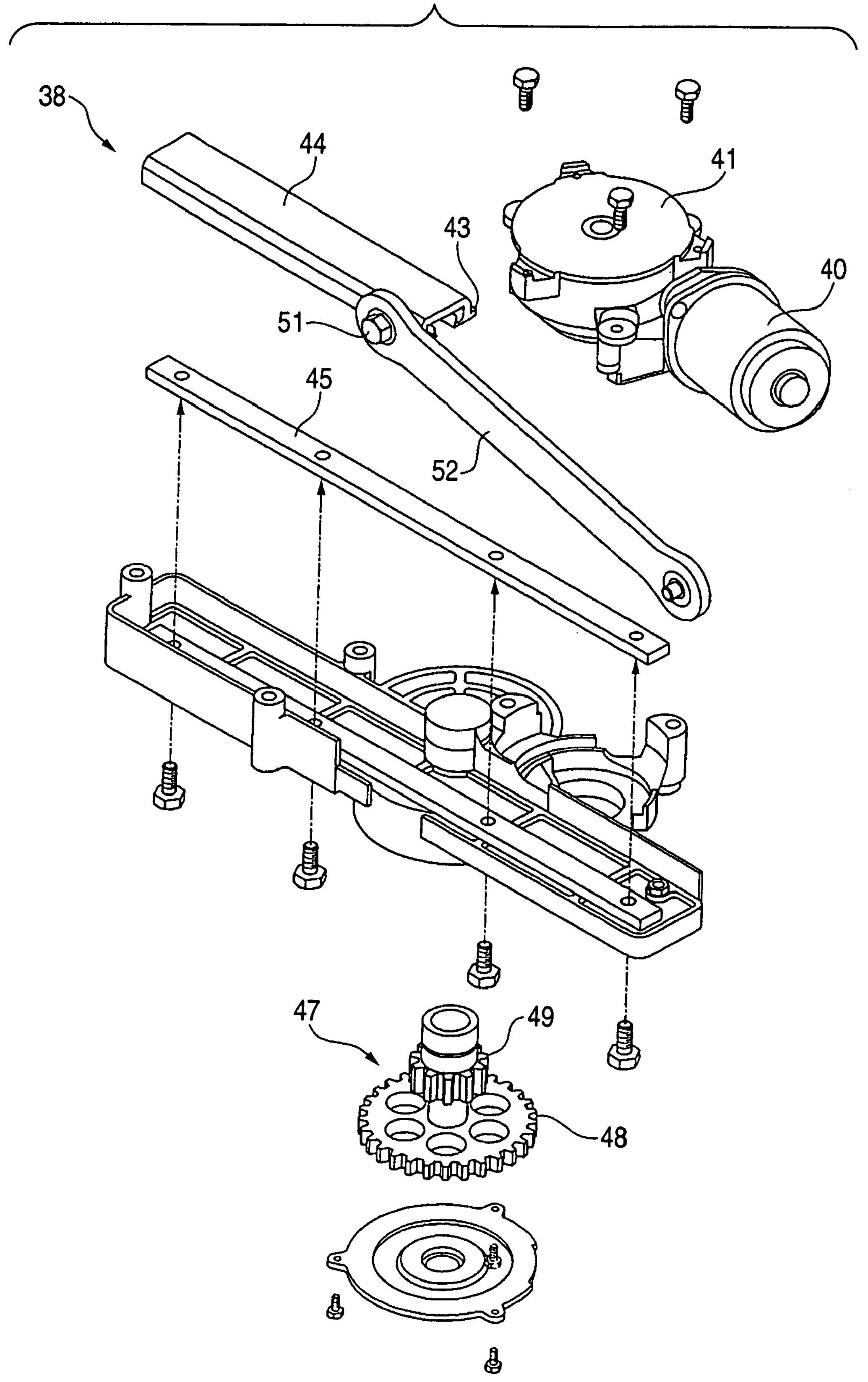
FIG. 5 is an exploded perspective view showing a driving mechanism portion in the powered tailgate system according to the first embodiment of the invention.
Figure 6:
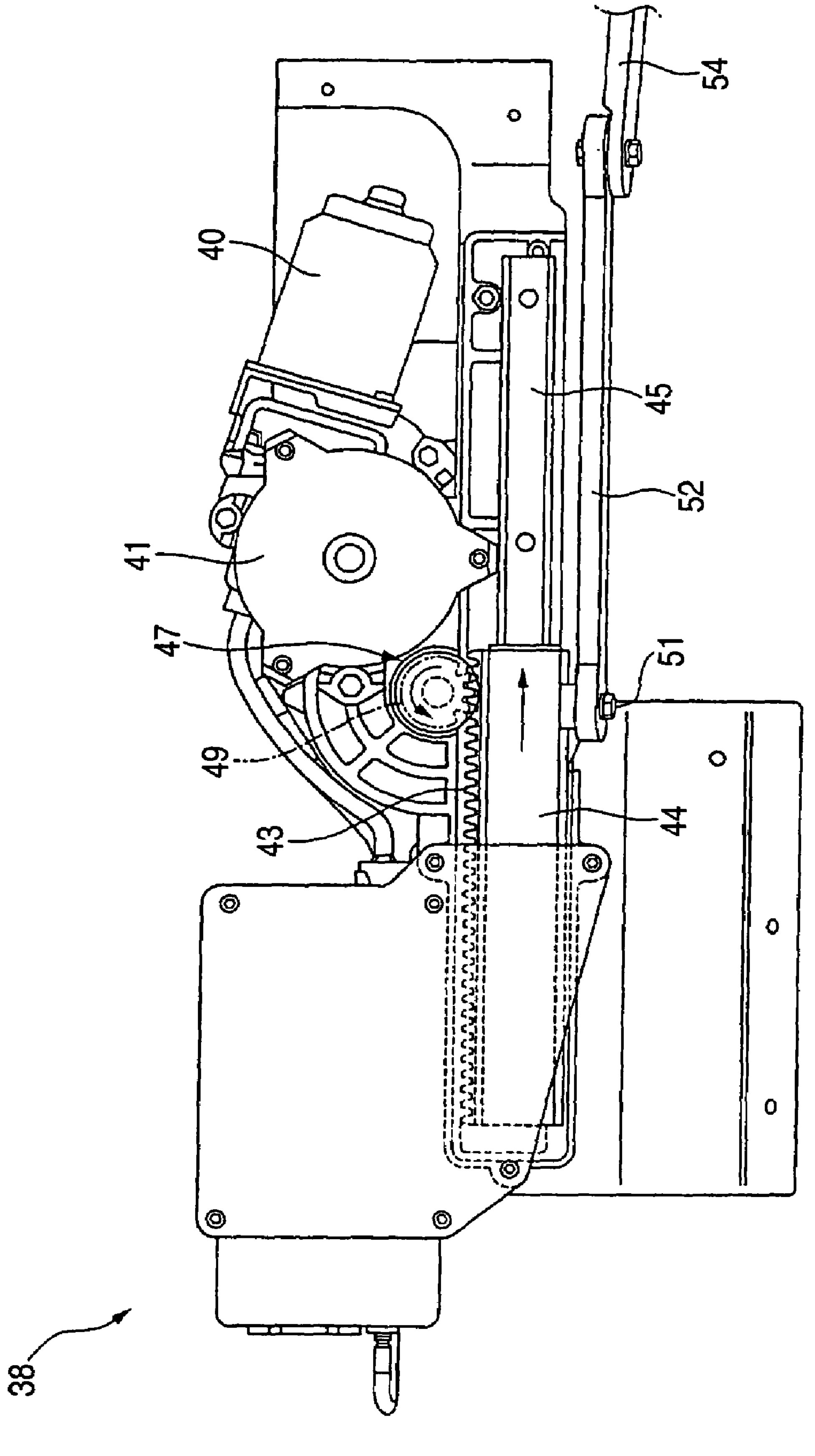
FIG. 6 is a plan view showing the driving mechanism portion in the powered tailgate system according to the first embodiment of the invention.

As shown in FIGS. 5 and 6, a driving mechanism portion 38 of the powered tailgate system 11 has an electric motor 40 and a gear box 41, and a worm gear and a wheel gear, not shown, are provided in the interior of the gear box 41 for suitably reducing the rotational force of the electric motor 40.

In addition, the driving mechanism portion 38 has a rack 44 of a linear shape which has a toothed or gear portion 43 formed on a longitudinal side thereof and a guide rail 45 for supporting the rack 44 in a posture in which its longitudinal direction extends along the longitudinal direction of the vehicle and guiding the rack 44 so as to slide linearly along the longitudinal direction of the vehicle body. As a result, the rack 44 is formed into a direct driven rack which moves linearly.

Furthermore, the driving mechanism portion 38 has a transmission gear 47 between the gear box 41 and the rack 44, and an intermediate gear portion 48 which rotates by virtue of an output from the gear box 41 and a pinion gear portion 49 which meshes with the gear portion 43 of the rack 44 are formed concentrically on the transmission gear 47.

From the construction described above, the driving mechanism portion 38 rotates the transmission gear 47 via the gear box 41 by rotating the electric motor 40 back and forth to thereby reciprocate the rack 44 which meshes with the pinion gear portion 49 of the transmission gear 47 at the gear portion 43 in the longitudinal directions of the vehicle body along the guide rail 45. In other words, the driving mechanism portion 38 transforms the rotational motion of the electric motor 40 into the linear motion of the rack.

A connecting shaft 51 extending transversely is attached to a side of the rack 44 which is opposite to the gear portion 43, and one end of a linear rod 52 is connected rotationally to the rack 44 via the connecting shaft 51. In addition, as shown in FIG. 4, one end of a curved arm 54 which curves in an arc in such a manner as to protrude downwardly is connected to the other end of the rod 52 via a connecting shaft 53 which extends transversely. Furthermore, a bracket 56 fixed to the tailgate 15 is connected rotationally to the other end of the curved arm 54 via a connecting shaft which extends transversely. Note that an arm side slider portion 60 which curves in an arc concentric with the curved arm 54 is provided on an upper side edge portion of the curved arm 54, and the curved arm 54 is formed into an arc-like shape whose center coincides with the swinging center O of the hinge 17 and moves in an arc about the swinging center O of the hinge 17 by supporting the arm side slider portion 60 by a plurality of load receiving portions 87 to 90 (which will be described later on).

Thus, in the driving mechanism portion 38, the connecting shaft 51 of the rack 44 moves linearly in the longitudinal directions of the vehicle when the rack 44 slides linearly by driving the electric motor 40. As a result, when the rack 44 slides to the rear, the rod 52 moves to the rear while rotating about the center of the connecting shaft 51, and the curved arm 54 swings in an arc while rotating about the center of the connecting shaft 53, whereby the tailgate 15 is pushed to be operated to be shifted from a state shown in FIG. 4 to a state shown in FIG. 7 for opening. On the contrary, when the rack 44 slides to the front by driving the electric motor 40, the curved arm 54, which is then pulled via the rod 52, pulls back the tailgate 15 while swinging in an arc so as to operate the tailgate 15 to shift from the state shown in FIG. 7 to the state shown in FIG. 4 for closure. Here, as shown in FIG. 7, a position resulting when the rack 44 slides to the rear end position constitutes a fully opened position of the tailgate 15, and as shown in FIG. 4, a position resulting when the rack slides to the front end position constitutes a fully closed position of the tailgate 15.

As shown in FIG. 4, with the rack 44 being located at the front end position and the tailgate 15 being situated at the fully closed position, the rod 52 extends from the position of the connecting shaft 51 of the rack 44 in a rearward and slightly downward diagonal direction. Namely, in the state in which the tailgate 15 is located at the fully closed position, the rear end of the rod 51, in other words, the connecting shaft 53 at the front end of the curved arm 54 is positioned rearward of and slightly below the connecting shaft 51 at the front end of the rod 52.

In addition, as shown in FIG. 4, with the tailgate 15 being situated at the fully closed position, the curved arm 54 curves in such a manner as to protrude downwardly and extends from the position of the connecting shaft 53 rearward and slightly downward. Namely, in the state in which the tailgate 15 is situated at the fully closed position, the connecting shaft 55 at the rear end of the curved arm 54 is situated at a position rearward of and slightly below the connecting shaft 53 at the front end of the curved arm 54. In addition, in the state in which the tailgate 15 is situated at the fully closed position, the connecting shaft 53 at the front end of the curved arm 54 and the connecting shaft 55 at the rear end thereof are situated above a lowest portion of the curved arm.

Figure 7:
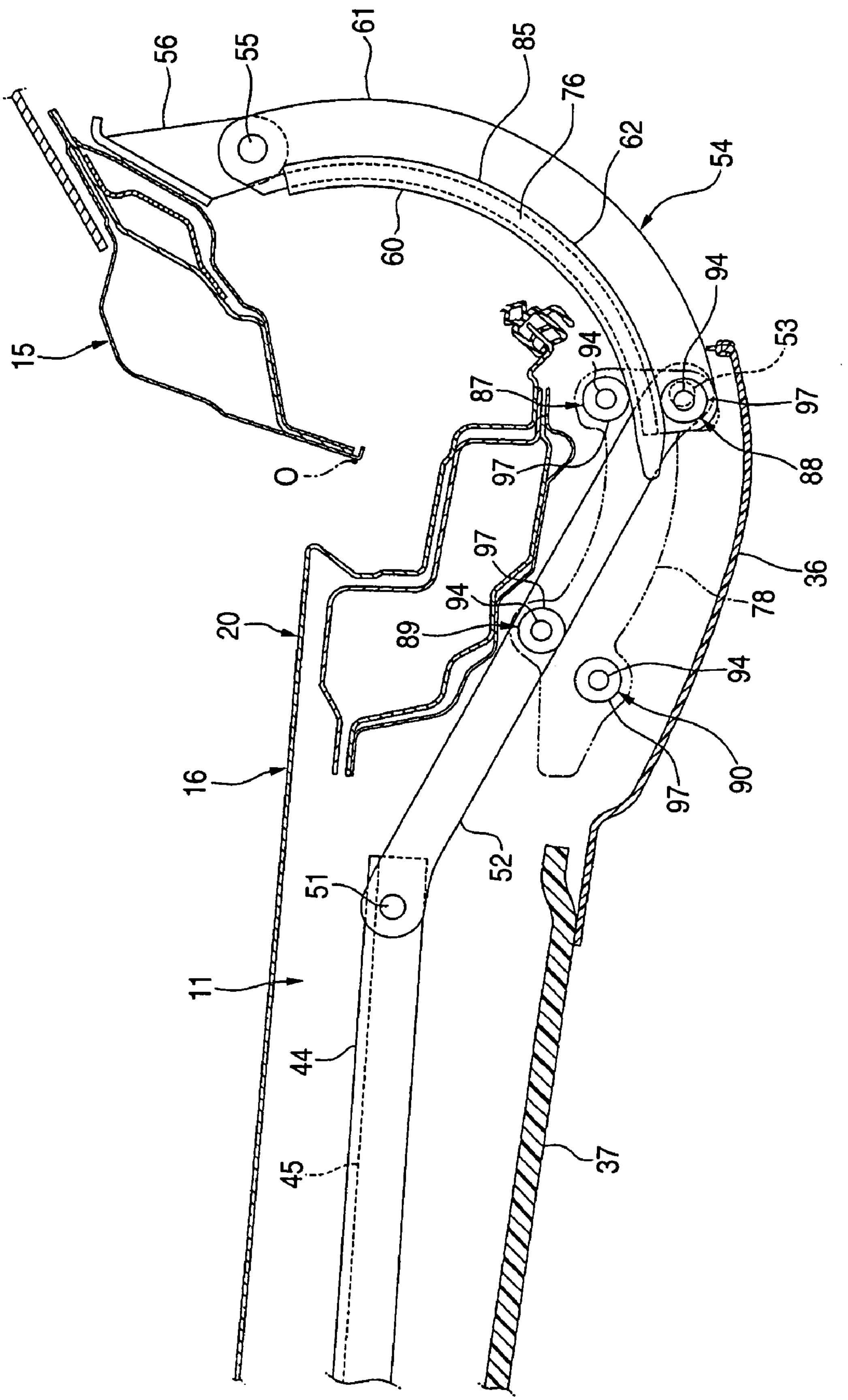
FIG. 7 is a side cross-sectional view showing the powered tailgate system according to the first embodiment of the invention, which shows the state in which the tailgate is fully opened.

On the other hand, as shown in FIG. 7, with the rack being located at the rear end position and the tailgate 15 being situated at the fully opened position, the rod 52 extends from the position of the connecting shaft 51 of the rack 44 in a rearward and slightly downward diagonal direction. Namely, in the state in which the tailgate 15 is situated at the fully opened position, the rear end of the rod 51, in other words, the connecting shaft 53 at the front end of the curved arm 54 is situated rearward of and slightly below the connecting shaft 51 at the front end of the rod 52. Here, the position of the connecting shaft 53 resulting when the tailgate 15 is situated at the fully opened position becomes rearward of and slightly below the position of the connecting shaft 53 resulting when the tailgate 15 is situated at the fully closed position.

In addition, as shown in FIG. 7, with the tailgate 15 being situated at the fully opened position, the curved arm 54 curves in such a manner as to protrude downwardly and extends from the position of the connecting shaft 53 rearward and slightly upward. Namely, with the tailgate 15 being situated at the fully opened position, the rear end of the rod 52, in other words, the connecting shaft 53 at the front end of the curved arm 54 is situated rearward of and slightly below the connecting shaft 51 at the front end of the rod 52. Here, the position of the connecting shaft 53 resulting when the tailgate 15 is situated at the fully opened position becomes rearward of and slightly below the position of the connecting shaft 53 resulting when the tailgate 15 is situated at the fully closed position.

Figure 8:
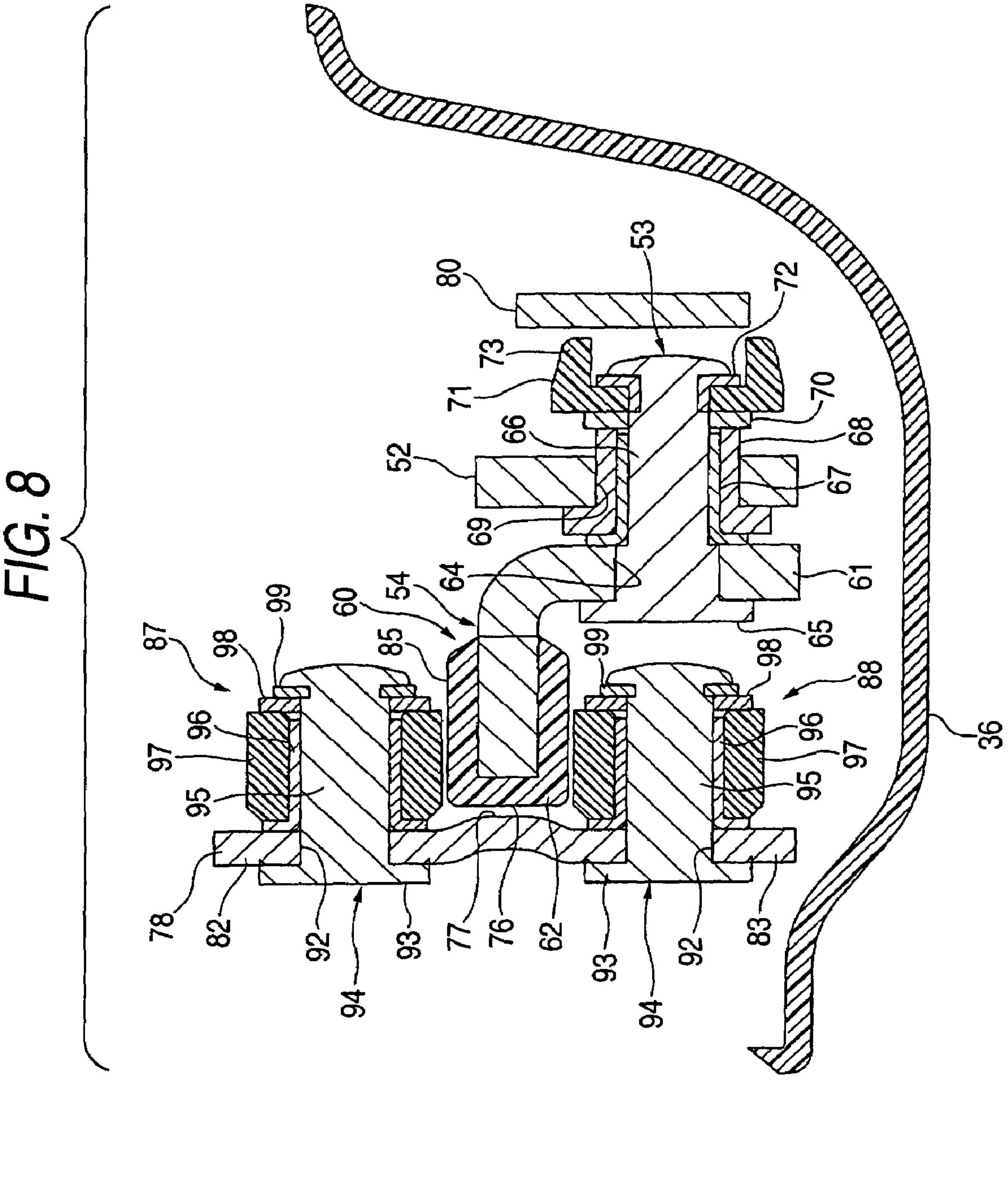
FIG. 8 is a cross-sectional view as seen from the rear which shows the powered tailgate system according to the first embodiment of the invention.

In the first embodiment, the arm side slider portion 60 which curves in an arc is, as shown in FIG. 8, formed in a curved fashion so as to protrude in the transverse direction toward a side opposite to the direction in which the connecting shaft 53 protrudes. The curved arm 54 has a base material 61 of iron and a sliding member 62 of resin that is fixed so as to cover a side of the base material 61 which is opposite to the protruding direction of the connecting shaft 53 and inner diameter and outside diameter sides of a curved portion of the base material 61 on a side thereof which faces the arm side slider portion 60.

Here, the connecting shaft 53 abuts with the curved arm 54 at a flange portion 65 formed at an axial end thereof in a state in which the connecting shaft 53 is passed through an attachment hole 64 in the curved arm 54. In this state, double bushes 67, 68 are fitted on a shaft portion 66 thereof which protrudes from the curved arm 54 toward a side opposite to the flange portion 65, and the outer bush 68 is fitted in a hole portion 69 in the rod 52. In addition, a washer 70 is fitted on a portion of the shaft portion 66 which protrudes from the bushes 67, 68 in such a manner as to abut with the outer bush 68, and furthermore, a resin slider 71 is fitted on the protruding shaft portion via a washer 72. In this state, the shaft portion 66 is clamped so as to connect together the curved arm 54, the connecting rod 53, the rod 52 and the slider 71. Note that the slider 71 has an oppositely facing portion 73 which protrudes axially outwardly of the connecting shaft 53 in an annular fashion.

A metallic guide member 78 is provided to be fixed to the vehicle body 13 side via the bracket 33 at a position facing the arm side slider portion 60 in the transverse direction, which metallic guide member 78 has a guide portion 77 for guiding an oppositely facing portion 76 situated on an opposite side with respect to the connecting shaft 53 of the sliding member 62 of the arm side slider portion 60 so as to restrict an unnecessary movement of the curved arm 54 and the connecting shaft 53 in a transverse direction. In addition, a metallic guide member 80 is provided to be fixed to the vehicle body 13 side in the transverse direction at a position facing the slider 71 of the connecting shaft 53 attached to the curved arm 54 for guiding the oppositely facing portion 73 of the slider 71 so as to restrict an unnecessary movement of the connecting shaft 53 and the curved arm 54 in an opposite transverse direction. Namely, the curved arm 54 is constructed to swing while being guided by the guide members 78, 80 on the transverse sides thereof, and these guide members 78, 80 have a length that allows for the restriction of the transverse movements over the whole swinging range of the curved arm 54.

The guide member 78 is such that the guide portion 77 is formed into a convex shape which protrudes in the transverse direction toward the curved arm 54 side. Then, load receiving portions 87 to 90 each adapted to be brought into sliding contact with a sliding portion 85 on the connecting shaft 53 side rather than the oppositely facing portion 76 of the sliding member 62 of the curved arm 54 so as to receive the load of the curved arm 54 are disposed at intervals at a plurality of, or, to be specific, two locations on either side of the curved arm 54 along the traveling direction of the curved arm 54. These load receiving portions 87 to 90 are all provided so as to coincide with the sliding portion 85 with respect to the transverse positions thereof, so that they can come into sliding contact with the sliding portion 85 so as to guide the movement of the arm side slider portion 60 or the curved arm 54.

The load receiving portions 87 to 90 are designed to have the same construction, and when attempting to describe only the load receiving portions 87, 88 which are shown in FIG. 8, each load receiving portion has a support shaft 94 which abuts with the guide member 78 at a flange portion 93 which is formed on one of axial ends thereof when passed through an attachment hole 92 in the guide member 78 to thereby extend in the transverse direction, a bush 96 fitted on a shaft portion 95 of the support shaft 94 which protrudes from the guide member 78, a resin guide roller 97 supported rotationally on the support shaft 94 via the bush 96 when fitted on the bush 96 and double washers 98, 99 which are fitted on a portion of the support shaft 94 which protrudes from the bush 96 of the shaft portion 95. Here, the support shaft 94 and the guide roller 97 are connected to the guide member 78 by clamping the shaft portion 95 which protrudes from the washers 98, 99. Thus, the guide roller 97 on each of the load receiving portions 87 to 90 is supported by the guide portion 78 with the axis of each guide roller 97 being aligned in the transverse direction.

As shown in FIG. 4, the load receiving portion 87 is provided at the position above the rear portion of the arm side slider portion 60 when the tailgate 15 is in the fully closed state. To be specific, when the tailgate 15 is in the fully closed state, the load receiving portion 87 is provided at the position which is suited in the vicinity of a front side of the connecting shaft 55 of the curved arm 54 which faces the tailgate 15 and which is situated rearward of the lowest portion of the curved arm 54. In addition, as shown in FIG. 7, when the tailgate 15 is in the fully opened state, the load receiving portion 87 is provided at the position above the connecting shaft 53 of the curved arm 54 which faces the rod 52.

As shown in FIG. 4, the load receiving portion 88 is provided at the position below the rear portion of the arm side slider portion 60 when the tailgate 15 is in the fully closed state. To be specific, when the tailgate 15 is in the fully closed state, the load receiving portion 88 is provided at the position which is suited in the vicinity of the front side of the connecting shaft 55 of the curved arm 54 which faces the tailgate 15 and which is situated rearward of the lowest portion of the curved arm 54. In addition, as shown in FIG. 7, when the tailgate 15 is in the fully opened state, the load receiving portion 87 is provided at the position which substantially coincides with the connecting shaft 53 of the curved arm 54 which faces the rod 52. Furthermore, the load receiving portion 88 is disposed so as to be situated substantially directly below the load receiving portion 87.

As shown in FIG. 4, the load receiving portion 89 is provided at the position above the front portion of the arm side slider portion 60 when the tailgate 15 is in the fully closed state. To be specific, when the tailgate 15 is in the fully closed state, the load receiving portion 89 is provided at the position which is suited in the vicinity of a rear side of the connecting shaft 53 of the curved arm 54 which faces the rod 52 and which is situated forward of the lowest portion of the curved arm 54. In addition, as shown in FIG. 7, when the tailgate 15 is in the fully opened state, the load receiving portion 89 is provided at the position which is apart from the curved portion 54.

As shown in FIG. 4, the load receiving portion 90 is provided at the position below the front portion of the arm side slider portion 60 when the tailgate 15 is in the fully closed state. To be specific, when the tailgate 15 is in the fully closed state, the load receiving portion 90 is provided at the position which is suited in the vicinity of a rear side of the connecting shaft 53 of the curved arm 54 which faces the rod 52 and which is situated forward of the lowest portion of the curved arm 54. In addition, as shown in FIG. 7, when the tailgate 15 is in the fully opened state, the load receiving portion 90 is provided at the position which is apart from the curved portion 54. Furthermore, the load receiving portion 90 is disposed on a prolongation connecting the load receiving portion 89 with the swinging center O of the hinge 17.

Figure 9:
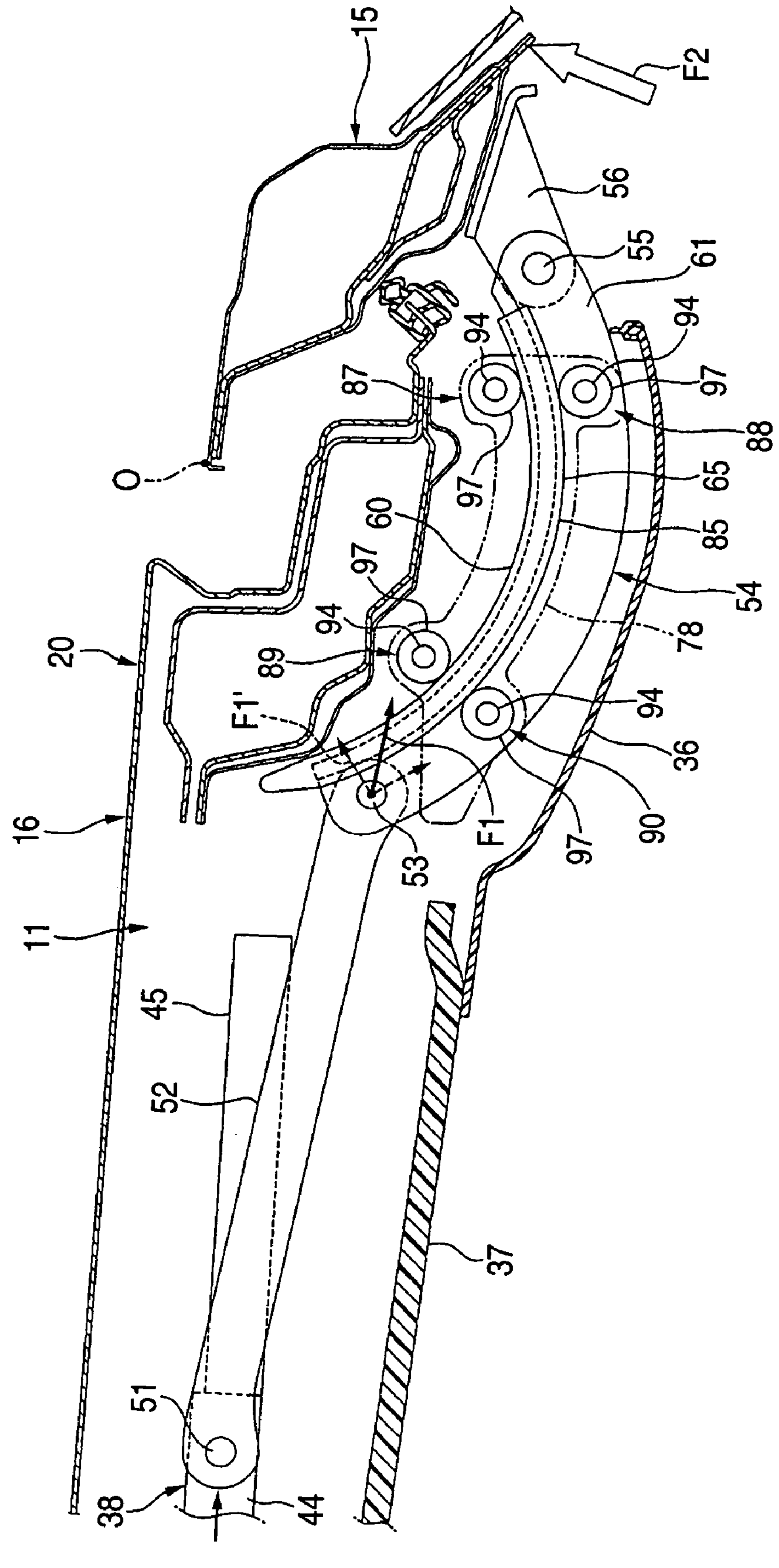
FIG. 9 is a side cross-sectional view showing the powered tailgate system according to the first embodiment of the invention, which shows an initial stage of an opening operation of the tailgate.
Figure 10:
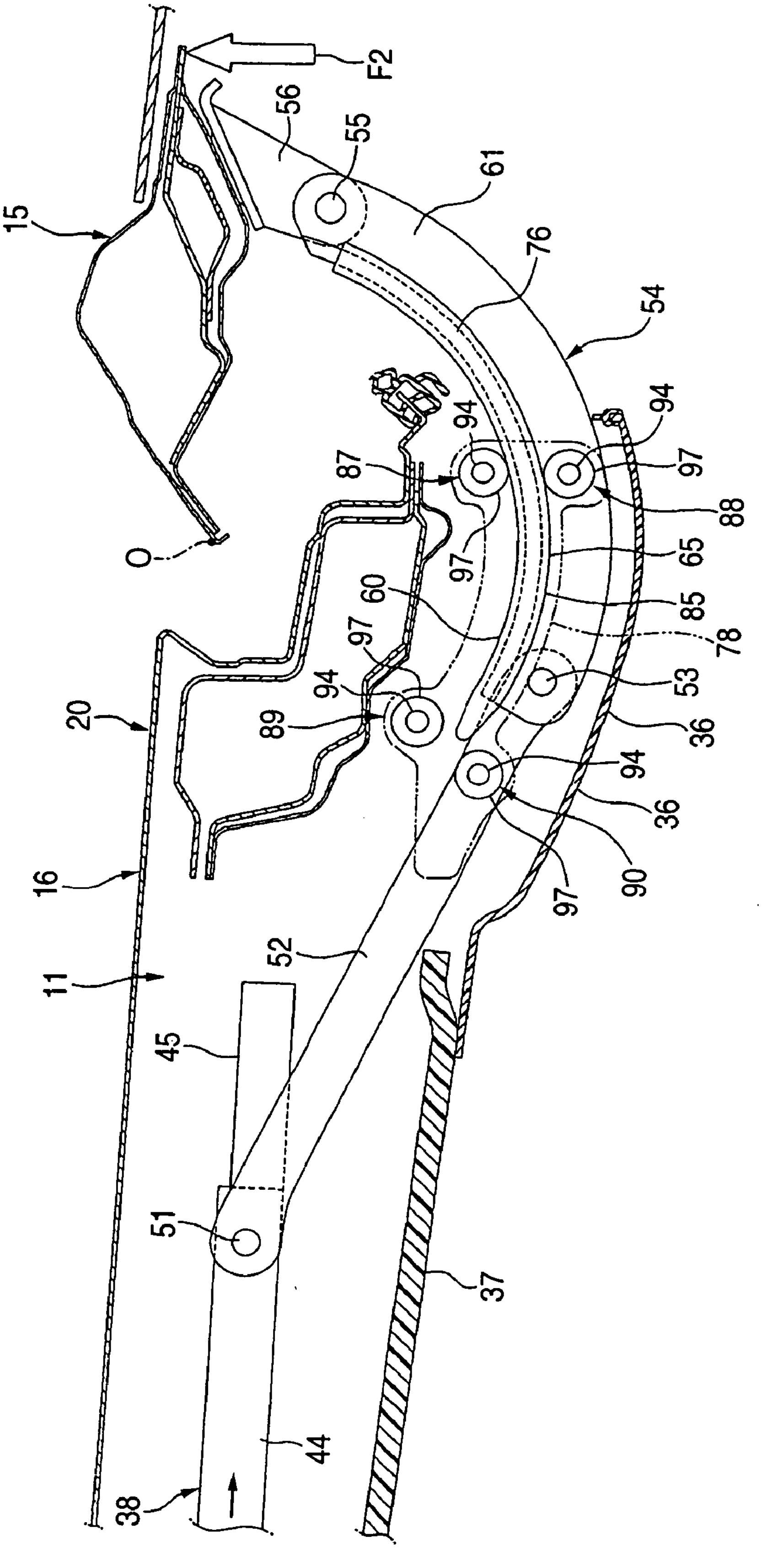
FIG. 10 is a side cross-sectional view showing the powered tailgate system according to the first embodiment of the invention, which shows a final stage of the opening operation of the tailgate.

According to the powered tailgate system 11 of the first embodiment that is constructed as is described heretofore, when the rack 44 is moved linearly backward from the state resulting when the tailgate 15 is fully closed as shown in FIG. 4 by driving the electric motor 40 so as to swing the curved arm 54 by the rack 44 so moved via the rod 52 to thereby operate the tailgate 15 to open, while a load F1 directed to the rear in the direction in which the rod 52 extends is generated in the curved arm 54 which is pressed by the rack 44 via the rod 52 in an initial stage of the opening process in particular as shown in FIG. 9, a partial load F1' of the load F1 so generated which is generated in a direction differing from the traveling direction of the curved arm 54 is received effectively by the load receiving portion 89 which is provided at the front upper position. In addition, when the rack 44 is moved linearly backward from the state resulting when the tailgate 15 is fully closed by driving the electric motor 40 so as to swing the curved arm 54 by the rack 44 so moved via the rod 52 to thereby operate the tailgate 15 to open, the tailgate 15 receives the biasing force of the outer stay 18 to be moved in the opening direction. As a result, as shown in FIGS. 9 and 10, while an upward load F2 is generated due to the biasing force of the outer stay 18, since the load receiving portion 87 which is provided at the rear upper position is always situated above the arm side slider portion 60, the load F2 so generated is effectively received by the load receiving portion 87.

Figure 11:
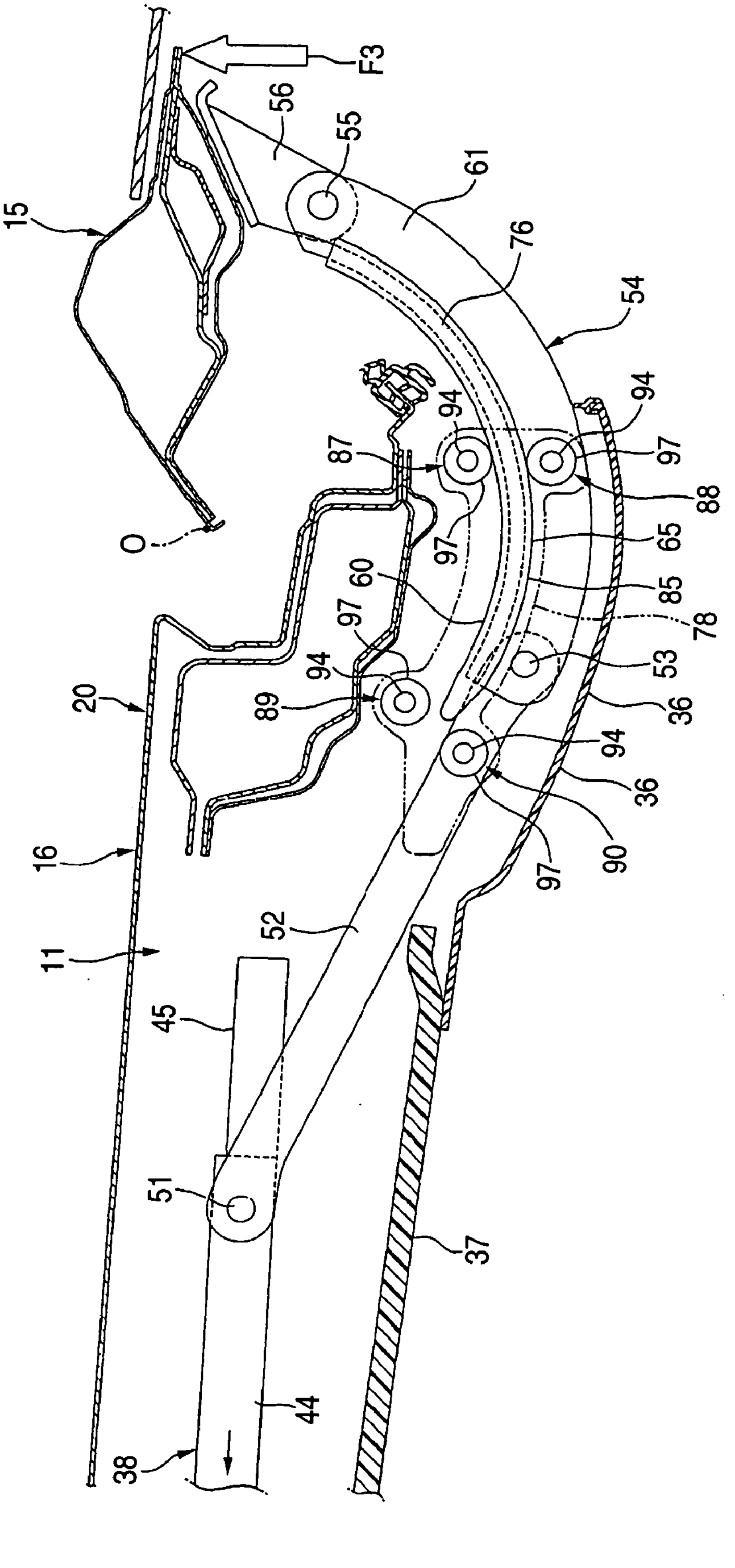
FIG. 11 is a side cross-sectional view showing the powered tailgate system according to the first embodiment of the invention, which shows an initial stage of a closing operation of the tailgate.

On the other hand, when the rack 44 is moved forward linearly from the state resulting when the tailgate 15 is fully opened as shown in FIG. 7 by driving the electric motor 40 so as to swing the curved arm 54 by the rack 44 via the rod 52 to thereby operate the tailgate 15 to close, while an upward load F3 is generated in the curved arm 54 due to the biasing force of the outer stay 18 as shown in FIG. 11 in an initial stage of the closing process in particular, since the load receiving portion 87 provided at the rear upper position is situated above the arm side slider portion 60, the load F3 so generated is effectively received by the load receiving portion 87.

Figure 12:
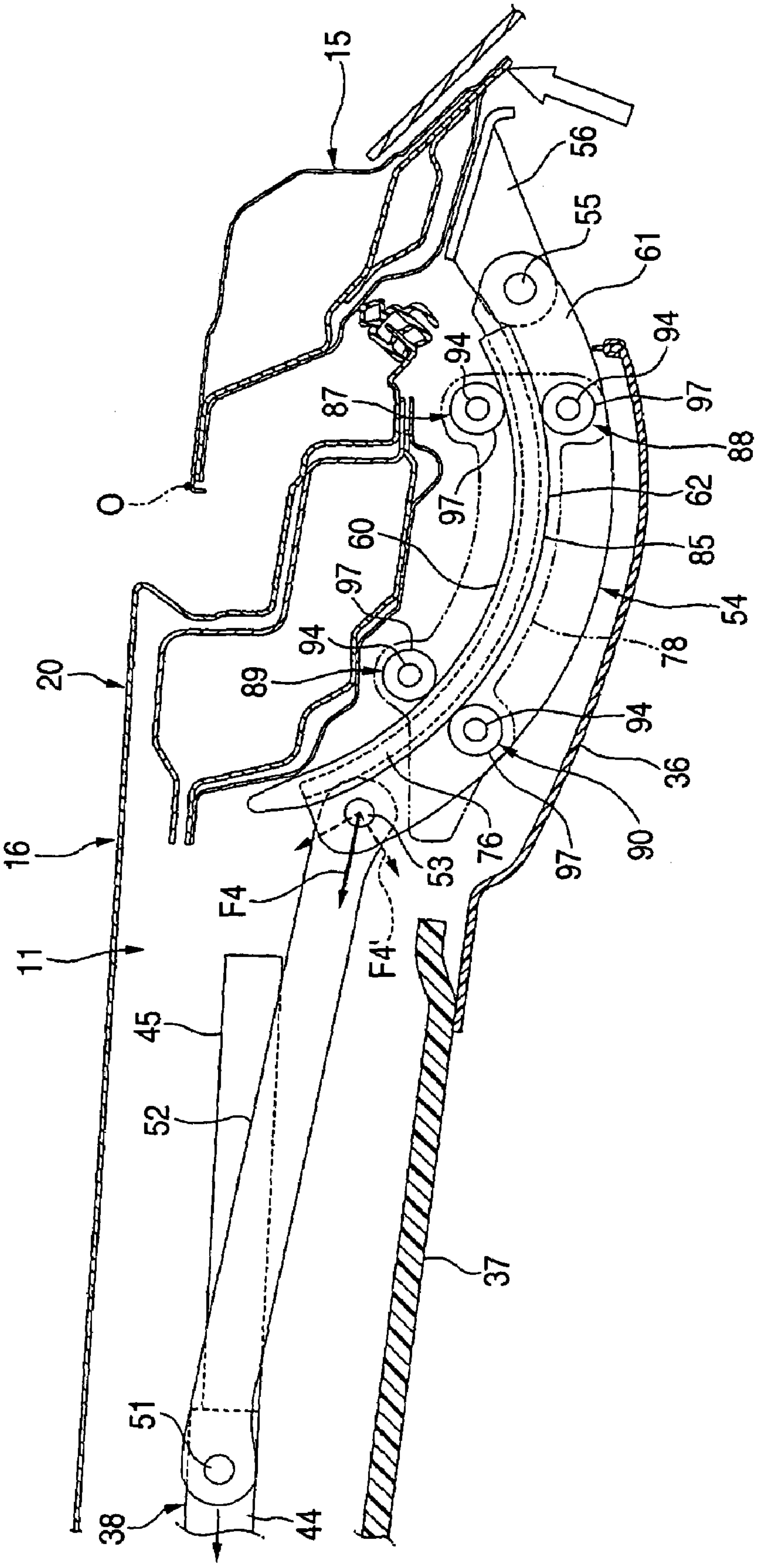
FIG. 12 is a side cross-sectional view showing the powered tailgate system according to the first embodiment of the invention, which shows a final stage of the closing operation of the tailgate.

In addition, when the rack 44 is moved forward linearly from the state resulting when the tailgate 15 is fully opened as shown in FIG. 7 by driving the electric motor 40 so as to swing the curved arm 54 by the rack 44 via the rod 52 to thereby operate the tailgate 15 to close, while a load F4 directed in the direction of the rack 44 along the rod 52 is generated in the curved arm 44 in a final stage of the closing process in particular as shown in FIG. 12, since the load receiving portion 90 provided at the front lower position is situated below and forward of the arm side slider portion 60, of the load F4, a partial load F4' directed in a downward and forward direction which differs from the traveling direction of the curved arm 54 is effectively received by the load receiving portion 90.

Figure 13:
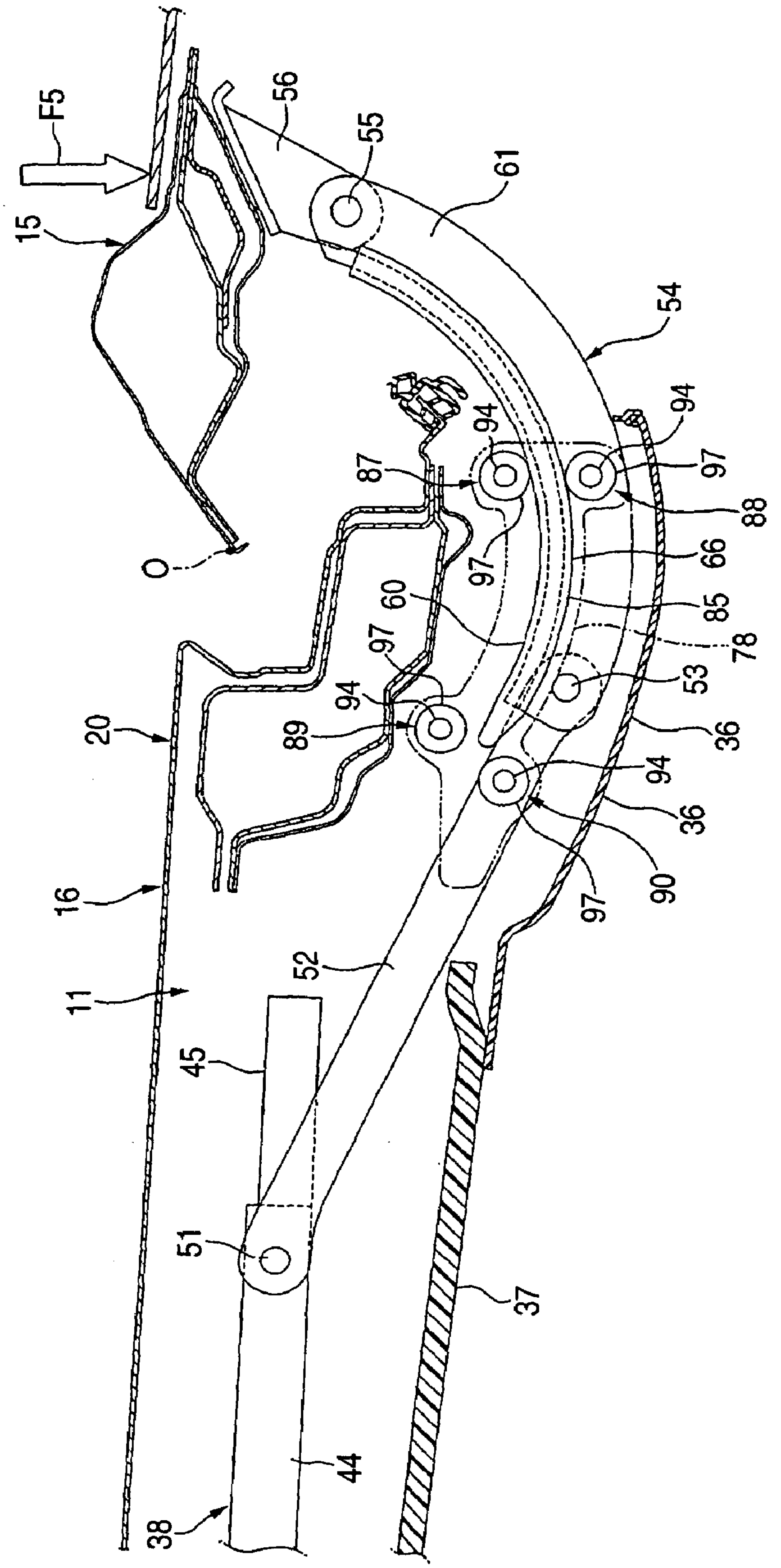
FIG. 13 is a side cross-sectional view showing the powered tailgate system according to the first embodiment of the invention, which shows a final stage of the opening operation of the tailgate.

Furthermore, when the curved arm 54 is swung by the rack 44 via the rod 52 so as to operate the tailgate 15 to open, while a downward load F5 is generated in the curved arm 54 as shown in FIG. 13, should the tailgate 15 collide with an obstacle in a final stage of the upward movement in particular, the load F5 so generated is effectively received by the load receiving portion 88 that is provided at the rear lower position.

Thus, according to the powered tailgate system 11 of the first embodiment that is described heretofore, since the direct driven rack 44 that does not oscillate vertically is used, the cover for covering the rack 44 on the passenger compartment side which includes the inner cover 36 and the roof lining 37 can be disposed at a higher position, and hence the head clearance above the head of the occupant in the vehicle can be secured. In addition, since the curved arm 54 is connected to the rack 44 via the rod 52, the electric motor 40 including the pinion gear portion 49 and the gear box 41 can be provided ahead of the opening at the rear of the vehicle that is opened and closed by the tailgate 15 so as to be apart from the opening. Additionally, since the plurality of load receiving portions 87 to 90 provided on the vehicle body 13 side and adapted to be brought into sliding contact with the arm side slider portion 60 provided on the curved arm 54 so as to bear the load are disposed at intervals along the traveling direction of the curved arm 54, the load receiving portions 87 to 90 can be disposed at positions that can provide good efficiency in accordance with the direction of load that differs depending on the traveling direction and position of the curved arm 54.

In addition, when the curved arm 54 is swung by the rack 44 via the rod 52 so as to operate the tailgate 15 to open, the tailgate 15 receives the biasing force of the outer stay 18 to thereby move in the opening direction, and as a result, while the upward load is generated in the curved arm 54, the load so generated can be effectively received by, among the load receiving portions 87 to 90 disposed along the traveling direction of the curved arm 54, the load receiving portion 87 that is provided at the position above the rear portion of the arm side slider portion 60 which results when the tailgate 15 is in the closed state. In addition, when the curved arm 54 is pulled back by the rack 44 via the rod 52 from its state resulting when the tailgate is opened, while the upward load is generated in the curved arm 54 due to the biasing force of the outer stay 18 in the initial stage of the pulling process in particular, the load so generated can be effectively received by, among the load receiving portions 87 to 90 disposed along the traveling direction of the curved arm 54, the load receiving portion 87 that is provided at the position above the rear portion of the arm side slider portion 60 which results when the tailgate is in the closed state. Thus, the load generated when the tailgate is opened or closed can be effectively received by the single load receiving portion 87.

Furthermore, when the curved arm 54 is swung by the rack 44 via the rod 52 so as to operate the tailgate 15 to open, while the load directed toward the tailgate 15 is generated in the curved arm 54 in the initial stage of the opening process in particular, a partial load of the load so generated which is directed in a direction different from the traveling direction of the curved arm 54 can be received by, among the load receiving portions 87 to 90 provided along the traveling direction of the curved arm 54, the load receiving portion 89 that is provided at the position above the front portion of the arm side slider portion 60 which results when the tailgate 15 is in the closed state.

Additionally, when the curved arm 54 is pulled back by the rack 44 via the rod 52 so as to operate the tailgate 15 to close, while the load directed toward the rack 44 is generated in the curved arm 54 in the final stage of the closing process in particular, the partial load of the load so generated that is directed in the direction differing from the traveling direction of the curved arm 54 can be received by, among the load receiving portions 87 to 90 provided along the traveling direction of the curved arm 54, the load receiving portion that is provided at the position below the front portion of the arm side slider portion 60 which results when the tailgate 15 is in the closed state.

Furthermore, when the curved arm 54 is swung by the rack 44 via the rod 52 so as to operate the tailgate 15 to open, while the downward load is generated in the curved arm 54 should the tailgate 15 collide with an obstacle in the final stage of the opening process in particular, the load so generated can be effectively received by, among the load receiving portions 87 to 90 provided along the traveling direction of the curved arm 54, the load receiving portion 89 that is provided at the position below the rear portion of the arm side slider portion 60 which results when the tailgate 15 is in the closed state.

Second Embodiment

Figure 14:
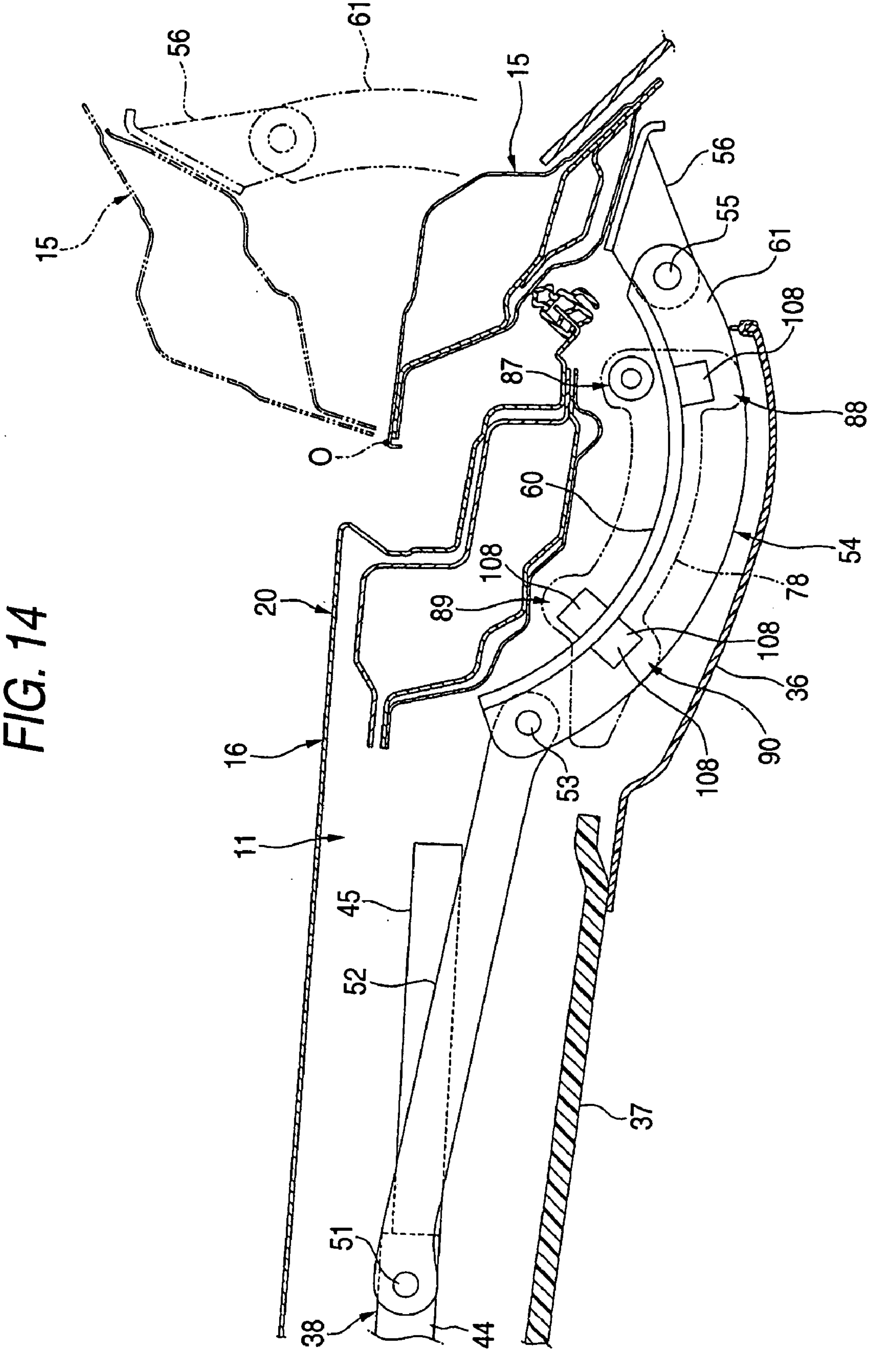
FIG. 14 is a side cross-sectional view showing a powered tailgate system according to a second embodiment of the invention, which shows by solid lines a state in which a tailgate is fully closed.

Next, referring to FIGS. 14 to 16, a second embodiment will be described while concentrating mainly on those which differ from the first embodiment.

Note that like reference numerals are given to like portions to those described with respect to the first embodiment, and the description thereof will be omitted.

In the second embodiment, a resin oppositely facing portion 76 is fixed to an arm side slider portion 60 of a curved arm 54 in such a manner as to cover only a distal end thereof, and a part made up of a base material 61 which is situated closer to a connecting shaft 53 than the oppositely facing portion 76 of the arm side slider portion 60 in a transverse direction constitutes a sliding portion 85.

In addition, in the second embodiment, a load receiving portion 87 that is provided at a position which is situated above a rear portion of the arm side slider portion 60 when a tailgate 15 is in a fully closed state has a support shaft 94 which extends along the transverse direction through abutment with a guide member 78 at a flange portion 93 formed at one of axial ends thereof when the support shaft 94 is passed through an attachment hole 92 in the guide member 78. In addition, a washer 104 is fitted on a shaft portion 95 of the support shaft 94 which protrudes from the guide member 78, and a pair of bushes 96 is fitted thereon, a resin guide roller 97 being rotationally fitted on the pair of bushes 96. Furthermore, in the load receiving portion 87 in the second embodiment, the shaft portion 95 of the support shaft 94 is passed through an attachment hole 101 in the other guide member 80, and a portion thereof which protrudes further from the guide member 80 is clamped. A washer 102 and a collar 103 are fitted on the shaft portion 95 between the bush 96 and the guide member 80.

In addition, in the second embodiment, a slider 71 is fitted on a bush 67 which is shared by a rod 52 and itself.

Furthermore, in the second embodiment, a load receiving portion 88 which is provided at a position which is situated below the rear portion of the arm side slider portion 60 when the tailgate 15 is in the closed state is allowed to be detached with respect to the guide member 78.

Figure 15:
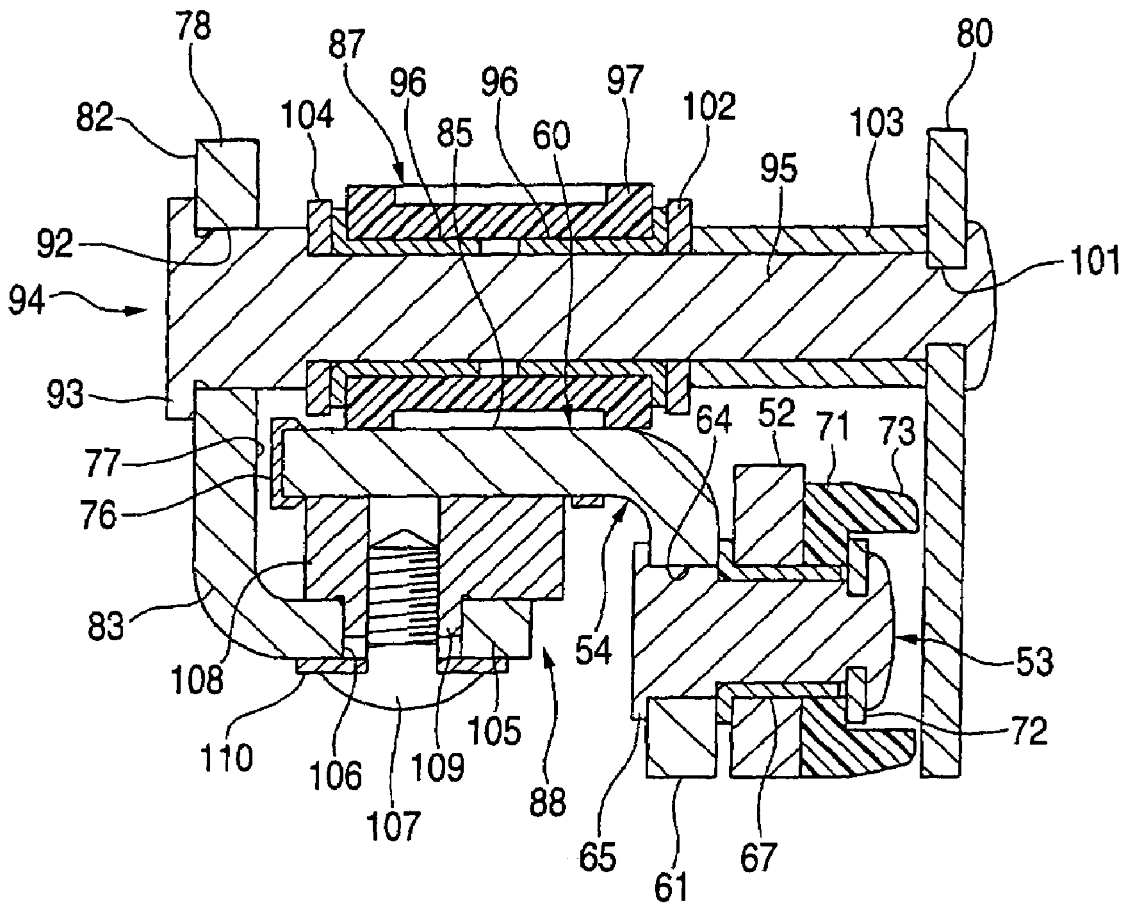
FIG. 15 is a side cross-sectional view as seen from the rear which shows the powered tailgate system according to the second embodiment of the invention.

Namely, as shown in FIG. 15, an extended plate portion 105 is formed on the guide member 78 in such a manner as to extend from a lower end of a lower plate portion 83 in parallel with the arm side slider portion 60. Then, an attachment hole 106 is formed in this extended plate portion 105, and while being fitted in the attachment hole 106 at an annular raised portion 109, a guide block 108 is attached to the extended plate portion 105 by a screw member 107 which is screwed thereinto and a washer 110. The guide block 108 is detached from the guide member 78 by releasing the threaded engagement thereof with the screw member 107.

In addition, in the second embodiment, a load receiving portion 89 that is provided at a position that is situated above a front portion of the arm side slider portion 60 when the tailgate 15 is in the fully closed state and a load receiving portion 90 that is provided at a position that is situated below the front portion of the arm side slider portion 60 when the tailgate 15 is in the fully closed state are also allowed to be detached with respect to the guide member 78.

Figure 16:
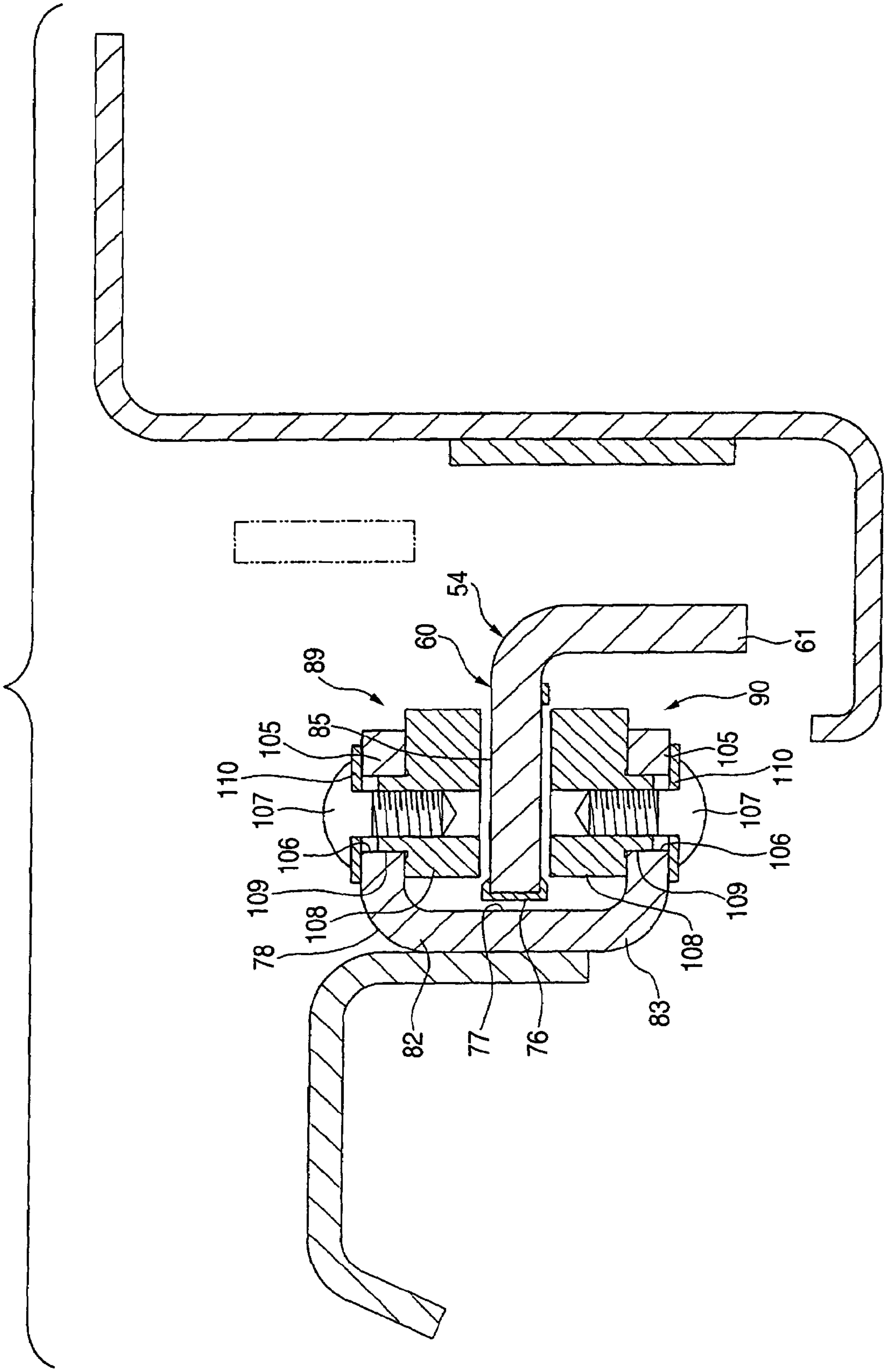
FIG. 16 is another cross-sectional view as seen from the rear which shows the powered tailgate system according to the second embodiment of the invention.

Namely, as shown in FIG. 16, extended plate portions 105 are formed on a guide member 78 which extend from an upper end of an upper plate portion 82 and a lower end of a lower plate portion 83, respectively, in parallel with the arm side slider portion 60, and an attachment hole 106 is formed in each of these extended plate portions 105. Then, in the load receiving portions 89, 90, as with the load receiving portion 88, while being fitted in the attachment holes 106 at annular raised portions 109, guide blocks 108 are attached to the extended plate portions 105 by screw members 107 which are screwed thereinto and washers 110, respectively. These guide blocks 108 are detached from the guide member 78 by releasing the threaded engagement thereof with the screw members 107.

According to the powered tailgate system of the second embodiment that is described above, since the load receiving portions 88 to 90 are provided detachably, even in the event that the load receiving portions 88 to 90 wear due to aged deterioration, the positional relationship with the curved arm 54 being thereby caused to deviate, the positional relationship can be restored only by replacing the deteriorated load receiving portions.

In addition, the positional relationship between the load receiving portions 88 to 90 and the curved arm 54 or the size of a gap between the load receiving portions 88 to 90 and the sliding portion 85 can easily be adjusted by preparing guide blocks 108 of plural types which differ in height and attaching the guide blocks 108 having appropriate heights. In this case, since the guide blocks 108 constitute position adjusting portions of the load receiving portions 88 to 90, the positional adjustment can easily be implemented. Instead of preparing the guide blocks 108 which differ in height, a shim may be inserted between the guide block 108 and the extended plate portion 105 so as to implement a positional adjustment of the guide block 108 by adjusting the thickness of the shim so inserted.

Note that, in the first and second embodiments, a resin may be applied separately to an outer circumferential side of the guide roller 97 which is brought into sliding contact with the sliding portion 85.

What is claimed is:

1. A powered tailgate system comprising:

a tailgate, a rod, a direct driven rack connected to a first end of the rod, a curved arm having a first end and a second end, said curved arm first end being connected to a second end of the rod and said curved arm second end being connected to the tailgate, an arm side slider portion being provided on said curved arm and curving concentrically with the curved arm, and a plurality of load receiving portions adapted to be brought into sliding contact with the arm side slider portion to receive a load, the load receiving portions being relatively stationary with respect to a vehicle body and disposed on a vehicle body side at intervals along a traveling direction of the curved arm, wherein the load receiving portions are detachably mounted.

2. The powered tailgate system as set forth in claim 1, wherein the load receiving portions are attached to the vehicle body via a hinge attaching bolt.

3. A vehicle, comprising:

a vehicle body, and a powered tailgate system that is secured to said vehicle body, said tailgate system comprising:

a tailgate pivotally secured to the vehicle body, a rod, a direct driven rack connected to a first end of the rod, wherein the rack is supported by a guide rail, a curved arm having a first end and a second end, said curved arm first end being connected to a second end of the rod and said curved arm second end being connected to the tailgate, an arm side slider portion being provided on said curved arm and curving concentrically with the curved arm, and a plurality of load receiving portions secured to said vehicle body and adapted to be brought into sliding contact with the arm side slider portion to receive a load, the load receiving portions being relatively stationary with respect to the vehicle body and disposed on the vehicle body at intervals along a traveling direction of the curved arm.

4. The vehicle as set forth in claim 3, wherein the load receiving portions of the powered tailgate system are detachably secured to the vehicle body.

5. A vehicle, comprising:

a vehicle body, and a powered tailgate system that is secured to said vehicle body, said tailgate system comprising:

a tailgate pivotally secured to the vehicle body, a rod, a direct driven rack connected to a first end of the rod, wherein the rack is supported by a guide rail, a curved arm having a first end and a second end, said curved arm first end being connected to a second end of the rod and said curved arm second end being connected to the tailgate, an arm side slider portion being provided on said curved arm and curving concentrically with the curved arm, and a plurality of load receiving portions secured to said vehicle body and adapted to be brought into sliding contact with the arm side slider portion to receive a load, the load receiving portions being relatively stationary with respect to the vehicle body and disposed on the vehicle body at intervals along a traveling direction of the curved arm, wherein the load receiving portions of the powered tailgate system are detachably secured to the vehicle body via a hinge attaching bolt.

6. A powered tailgate system, comprising:

a tailgate, a rod, a direct driven rack connected to a first end of the rod, a curved arm having a first end and a second end, said curved arm first end being connected to a second end of the rod and said curved arm second end being connected to the tailgate;

an arm side slider portion being provided on said curved arm and curving concentrically with said curved arm, a plurality of load receiving portions adapted to be brought into sliding contact with the arm side slider portion to receive a load, the load receiving portions being relatively stationary with respect to a vehicle body and disposed on a vehicle body side at intervals along a traveling direction of the curved arm, and an outer stay connected to the tailgate, wherein the load receiving portions are provided at positions relatively above a rear portion, above a front portion, below a front portion, or below a rear portion of the arm side slider which results when the tailgate is in a closed position.

7. The powered tailgate system as set forth in claim 6, wherein the load receiving portions are detachable mounted.

8. A vehicle comprising:

a vehicle body, and a powered tailgate system that is secured to the vehicle body, said powered tailgate system, comprising:

a tailgate, a rod, a direct driven rack connected to a first end of the rod, a curved arm having a first end and a second end, said curved arm first end being connected to a second end of the rod and said curved arm second end being connected to the tailgate;

an arm side slider portion being provided on said curved arm and curving concentrically with said curved arm, a plurality of load receiving portions adapted to be brought into sliding contact with the arm side slider portion to receive a load, the load receiving portions being relatively stationary with respect to a vehicle body and disposed on a vehicle body side at intervals along a traveling direction of the curved arm, and an outer stay connected to the tailgate, wherein the load receiving portions are provided at positions relatively above a rear portion, above a front portion, below a front portion, or below a rear portion of the arm side slider which results when the tailgate is in a closed position.

* * * * *